United States Patent
Youssef et al.

(10) Patent No.: US 9,161,328 B2
(45) Date of Patent: Oct. 13, 2015

(54) AUTOMATIC AND WIRELESS SHARING OF LOCATION INFORMATION BETWEEN A LOCATION-AWARE DEVICE AND A LOCATION-UNAWARE DEVICE

(71) Applicant: Samsung Electronics Co., Ltd., Suwon-si, Gyeonggi-do (KR)

(72) Inventors: Mohamed Youssef, Marion, IA (US); Bruce McCullough, Robins, IA (US); Andi Jakupi, Marion, IA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 82 days.

(21) Appl. No.: 13/902,728

(22) Filed: May 24, 2013

(65) Prior Publication Data

US 2014/0349673 A1 Nov. 27, 2014

(51) Int. Cl.
*H04W 64/00* (2009.01)

(52) U.S. Cl.
CPC ..................................... *H04W 64/00* (2013.01)

(58) Field of Classification Search
CPC ........ H04W 4/02; H04W 4/023; H04W 64/00
USPC ........ 455/456.1, 456.6, 456.3, 457, 421, 440, 455/441
See application file for complete search history.

(56) References Cited

U.S. PATENT DOCUMENTS

| | | | |
|---|---|---|---|
| 2006/0030339 A1 | 2/2006 | Zhovnirovsky et al. | |
| 2009/0061793 A1* | 3/2009 | Jung et al. | 455/90.1 |
| 2009/0061896 A1* | 3/2009 | Jung et al. | 455/456.2 |
| 2010/0105409 A1 | 4/2010 | Agarwal et al. | |
| 2011/0130958 A1 | 6/2011 | Stahl et al. | |
| 2011/0171973 A1* | 7/2011 | Beck et al. | 455/456.2 |
| 2011/0199917 A1* | 8/2011 | Karaoguz et al. | 370/252 |
| 2012/0021759 A1* | 1/2012 | Chen et al. | 455/456.1 |
| 2014/0141714 A1* | 5/2014 | Ghosh et al. | 455/39 |

FOREIGN PATENT DOCUMENTS

JP 2009017217 A 1/2009

* cited by examiner

*Primary Examiner* — Nathan Mitchell
*Assistant Examiner* — Sayed T Zewari
(74) *Attorney, Agent, or Firm* — Renaissance IP Law Group LLP (57) ABSTRACT

Disclosed system and method enable a location-unaware device to know its approximate location by wirelessly near-field coupling it to a geo-proximate location-aware device such as a Global Navigation Satellite System—(GNSS)-enabled mobile phone. The geo-location data are conveyed in accordance with a predefined signaling protocol. Request and response mechanisms within the devices take the form of predefined data packets that convey geo-location and the devices' unique identification (ID) information.

18 Claims, 8 Drawing Sheets

AUTOMATIC AND WIRELESS SHARING OF LOCATION INFORMATION BETWEEN A LOCATION-AWARE DEVICE AND A LOCATION-UNAWARE DEVICE

FIELD OF USE

Some electronic devices such as mobile phones are equipped with geo-location awareness, e.g. they are inherently capable of determining their geo-location. Other electronic devices such as digital cameras are not so equipped and thus are inherently geo-location-unaware. Geo-location-unaware devices thus are less capable in many applications for which geo-location-awareness would be useful.

SUMMARY

A disclosed geo-locating system includes a first device configured with position determination, the first device further configured to establish operative communication with a second device by way of a wireless connection thereby to form an operatively coupled pair of devices, the first device further configured thereafter to continue operative wireless communication with the second device thereby to transmit current position data to the second device, the current position data representing the approximate position of the operatively coupled pair of first and second devices; and a second device not configured with position determination capability, the second device further configured to establish operative communication with the first device and thereafter to store current position data received therefrom so long as the first and second devices are within range of their established wireless connection.

In accordance with one embodiment of the disclosure, the second device in order to establish the operative connection may send to the first device a request for geo-location data from the first device to be conveyed to the second device in accordance with a defined protocol. In accordance with another embodiment, the first device in order to establish the operative connection may send to the second device an executable sequence of instructions and a command to the second device to execute the instructions, and the second device in response may send to the first device a request for geo-location data from the first device to be conveyed to the second device in accordance with a defined protocol.

In accordance with another embodiment, the first device may update the position data and may send the same to the second device upon a demand by the second device. Alternatively, the first device may update the position data and may send the same to the second device periodically and automatically regardless of whether the geo-location data have changed. Alternatively, the first device may automatically update the position data and may automatically send the same to the second device upon the occurrence of a defined event. Alternatively, the first device automatically may update the position data and may automatically send the same to the second device upon the occurrence of an event wherein there is detected a change in position of greater than a defined threshold amount.

In accordance with another embodiment, the data are updated via one or more predefined data packets in accordance with a predefined signaling protocol. In accordance with another embodiment, the operative communication is effected via a near-field wireless conveyance mechanism. In accordance with another embodiment, the signaling protocol incorporates a peer-to-peer (P2P) wireless standard and/or network architecture.

A disclosed method for enabling a location-unaware device having no self-geo-locating capability to determine its geo-location includes operatively wirelessly coupling the location-unaware device with a physically proximate and geo-location-aware device, and conveying geo-location data from the location-aware device to the location-unaware device, thereby to render the location-unaware device approximate-location-aware. The coupling may be performed by executing memory-stored instructions by one or more processors. The operative communication may be effected via a near-field wireless conveyance mechanism. The conveying of the geo-location data may be performed in accordance with a predefined signaling protocol. The signaling protocol may incorporate a peer-to-peer (P2P) wireless standard and/or network architecture.

Another disclosed system for operatively coupling a pair of physically proximate devices includes at least one of a) a location-aware device, and b) a location-unaware device, wherein the location-aware device may be configured to donate geo-location information to the location-unaware device over a near-field wireless conveyance, and wherein the location-unaware device may be configured to receive geo-location information from the location-aware device over the near-field wireless conveyance. The donated and received geo-location information may be conveyed in accordance with a predefined signaling protocol. The predefined signaling protocol may incorporates a peer-to-peer (P2P) wireless standard and/or network architecture. The geo-location information may be requested by the location-unaware device and may be conveyed in a data packet along with location-unaware device identification (ID) information. The geo-location information may be donated by the location-aware mobile device in response to a request from the location-unaware device and may be conveyed in a data packet along with location-aware device identification (ID) information.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of similar or identical elements or features.

DETAILED DESCRIPTION

Example embodiments of the inventive concepts will now be described more fully with reference to the accompanying drawings, in which example embodiments are shown. Example embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, dimensions may be exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present except perhaps for a passive conductor, e.g. a land, a wire, or a solder ball, or the like. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various devices, protocols, data structures, elements, components, regions, layers and/or sections, these elements, components, regions, layers and/or sections should not be limited by these terms. These terms are only used to distinguish one device, protocol, data structure, element, component, region, layer or section from another device, protocol, data structure, element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, devices, protocols, data structures, elements and/or components, but do not preclude the presence or addition of one or more other features, integers, steps, operations, devices, protocols, data structures, elements, components and/or groups thereof.

Example embodiments of the inventive concepts are described herein with reference to schematic illustrations of idealized embodiments (and intermediate structures) of example embodiments. As such, variations from the shapes of the illustrations as a result, for example, of manufacturing techniques and/or tolerances, are to be expected. Thus, example embodiments of the inventive concepts should not be construed as limited to the particular shapes of devices, components, connections, etc. illustrated herein but are to include deviations in shapes that result, for example, from manufacturing. Thus, the features illustrated in the figures are schematic in nature and their shapes are not intended to illustrate the actual shape of a device and are not intended to limit the scope of example embodiments or the invention as claimed.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

DEFINITIONS

"Device" herein refers broadly to any electronic apparatus. "Mobile device" herein refers broadly to a device that is either manually mobile or capable of and likely to be manually moved during its useful life. "Location-awareness" and "location-aware" herein refers to a device's inherent ability or capacity to determine its own geo-location or geographic position via, for example, a Global Navigation Satellite System (GNSS) or a Global Positioning System (GPS) or other satellite-based or non-satellite-based global positioning link or utility or signal or sensor source such as WiFi positioning, cellular-based (e.g. cell tower-based) positioning, micro-electro-mechanics (MEMs)/inertial sensor techniques or the like. "Location-unaware" and "Location-unawareness" herein refers to a device's inherent inability or incapacity to determine its own geo-location or geographic position. "Approximate-location-aware" or "approximate-location-awareness" herein refers to an inherently location-unaware device that is enabled to become aware of its approximate location, e.g. to within a reasonable degree of certainty such as a few meters, due to its wireless coupling with a location-aware device in accordance with the embodiments described and illustrated herein.

"Geographic location" and "geo-location" herein refer to global coordinates that describe a person or object's absolute or relative position in terms of its position relative to the earth's longitude, latitude, and perhaps elevation parameters (by the use of known multisatellite (so-called "tri-lateration" GPS techniques or the like). "Geo-proximate" and "geoproximity" herein refer to physically proximate persons or objects, e.g., ones that are within a few or several meters' radius of another. "Geo-remote" or "geo-remoteness" herein refer to physically remote persons or objects, e.g., ones that are not within a few or several meters radius of another.

"Peer-to-Peer", "P2P", and "Peer Network" used interchangeably herein refer somewhat conventionally to an operatively-coupled-devices-network architecture and protocol wherein each device is quite capable of, and responsible for, performing a particular task in an approximately equal manner through a third party and without an Internet connection. This featured P2P model contrasts with a client-server model in which an Internet-coupled server is primarily or solely responsible and capable of performing a particular task as a "master" with a server-coupled "slave" client not responsible for and incapable of performing the task without the server's control "mastery."

Figure 1:
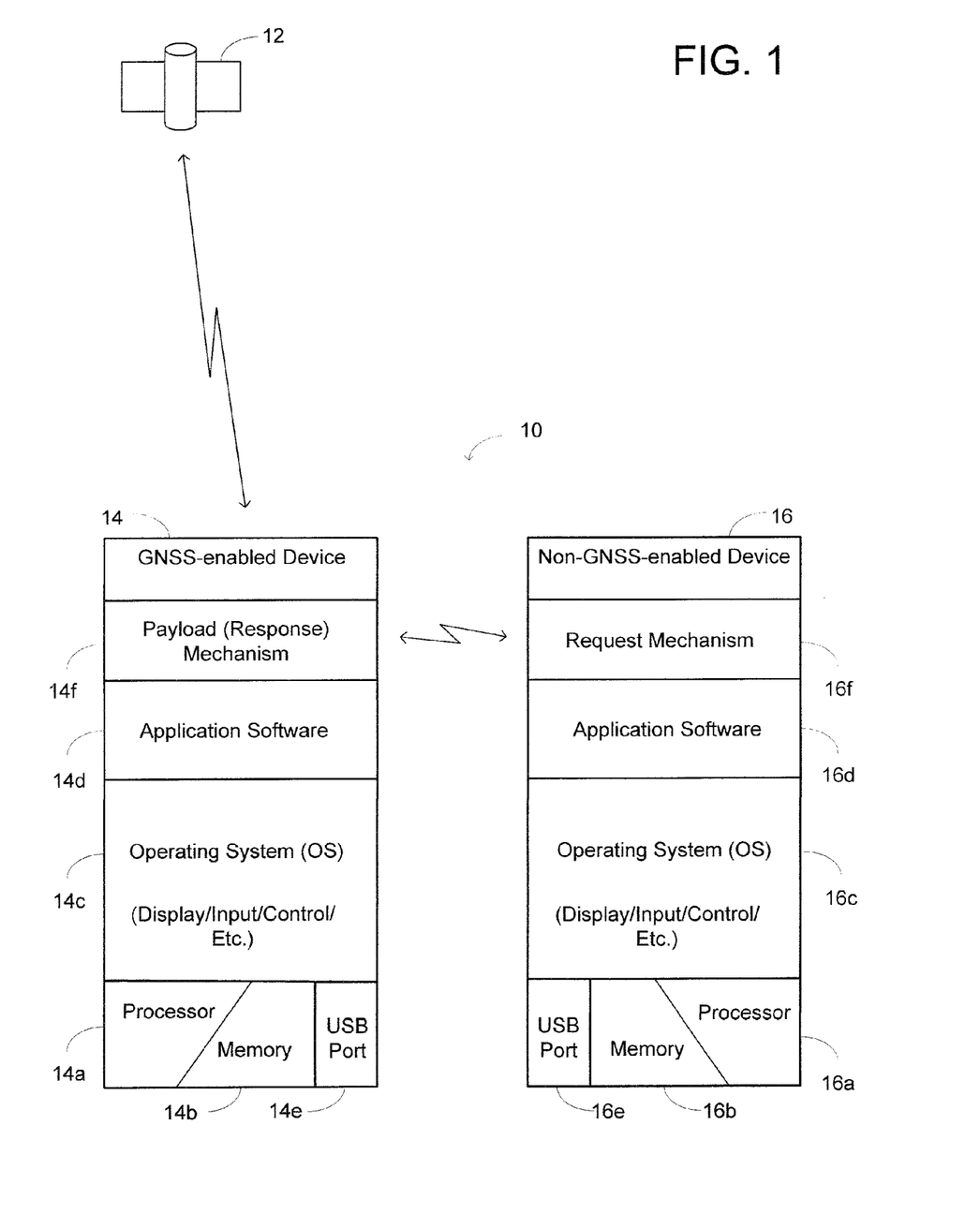
FIG. 1 is a schematic block diagram illustrating an embodiment of the geo-proximate devices system.

FIG. 1 is a system block diagram illustrating an embodiment of the geo-proximate devices system.

Figure 2:
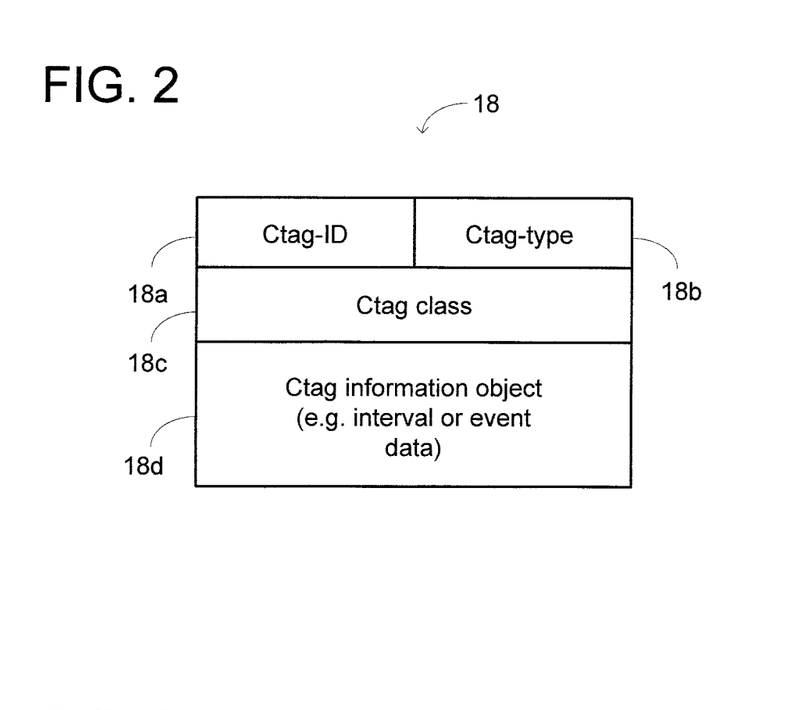
FIG. 2 is a schematic diagram of a communication tag—(Ctag)-request data packet used by the geo-proximate devices system.

FIG. 2 is a schematic diagram of a communication tag—(Ctag)-request data packet used by the geo-proximate devices system.

Figure 3:
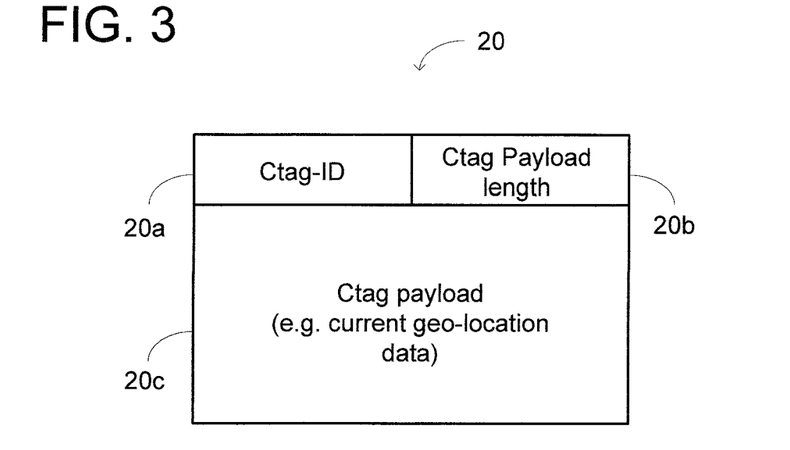
FIG. 3 is a schematic diagram of a Ctag-payload data packet used by the geo-proximate devices system.

FIG. 3 is a schematic diagram of a Ctag-payload data packet used by the geo-proximate devices system.

Figure 4A:
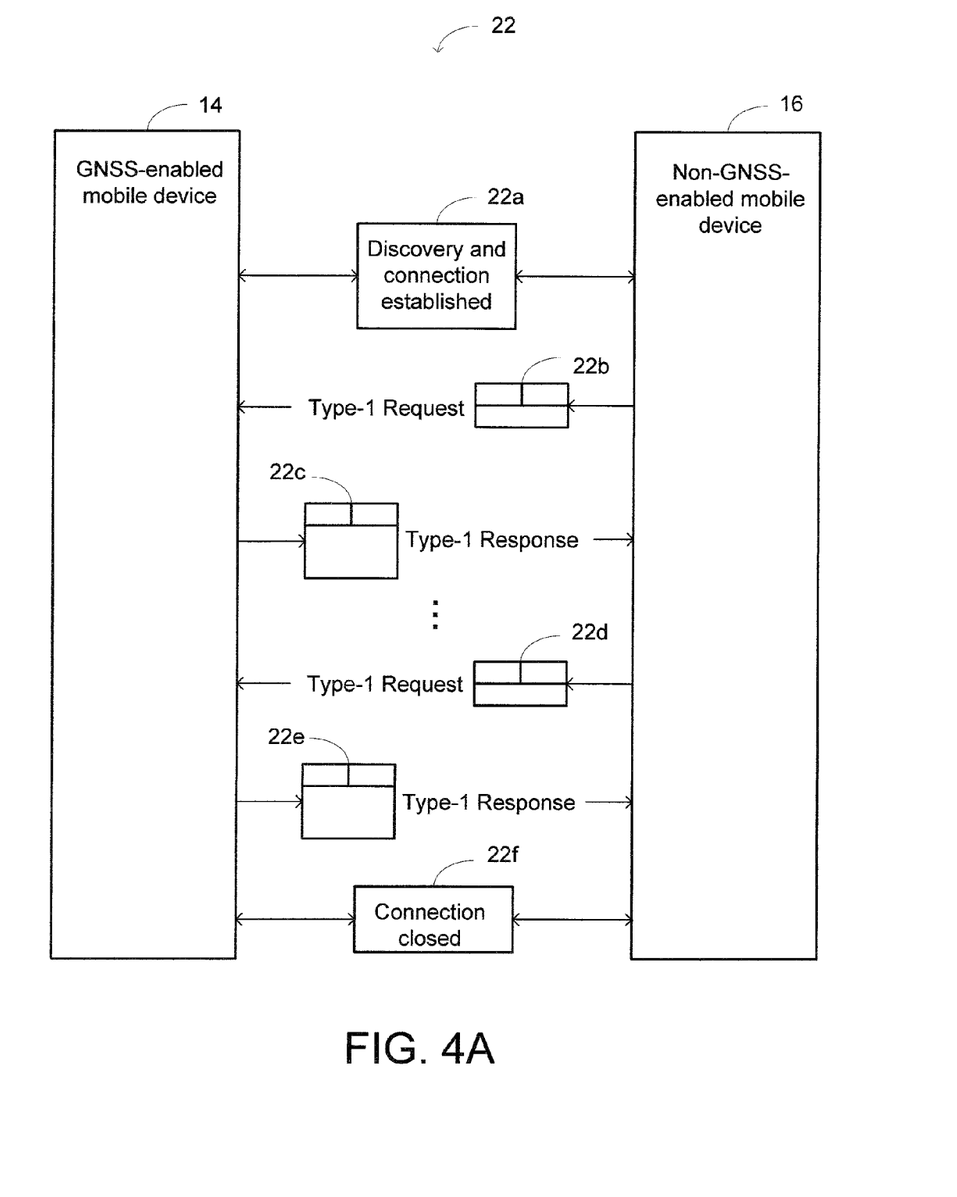
FIGS. 4A-4C are process/method flow diagrams illustrating three alternative modes of operation of the geo-proximate devices system.
Figure 4B:
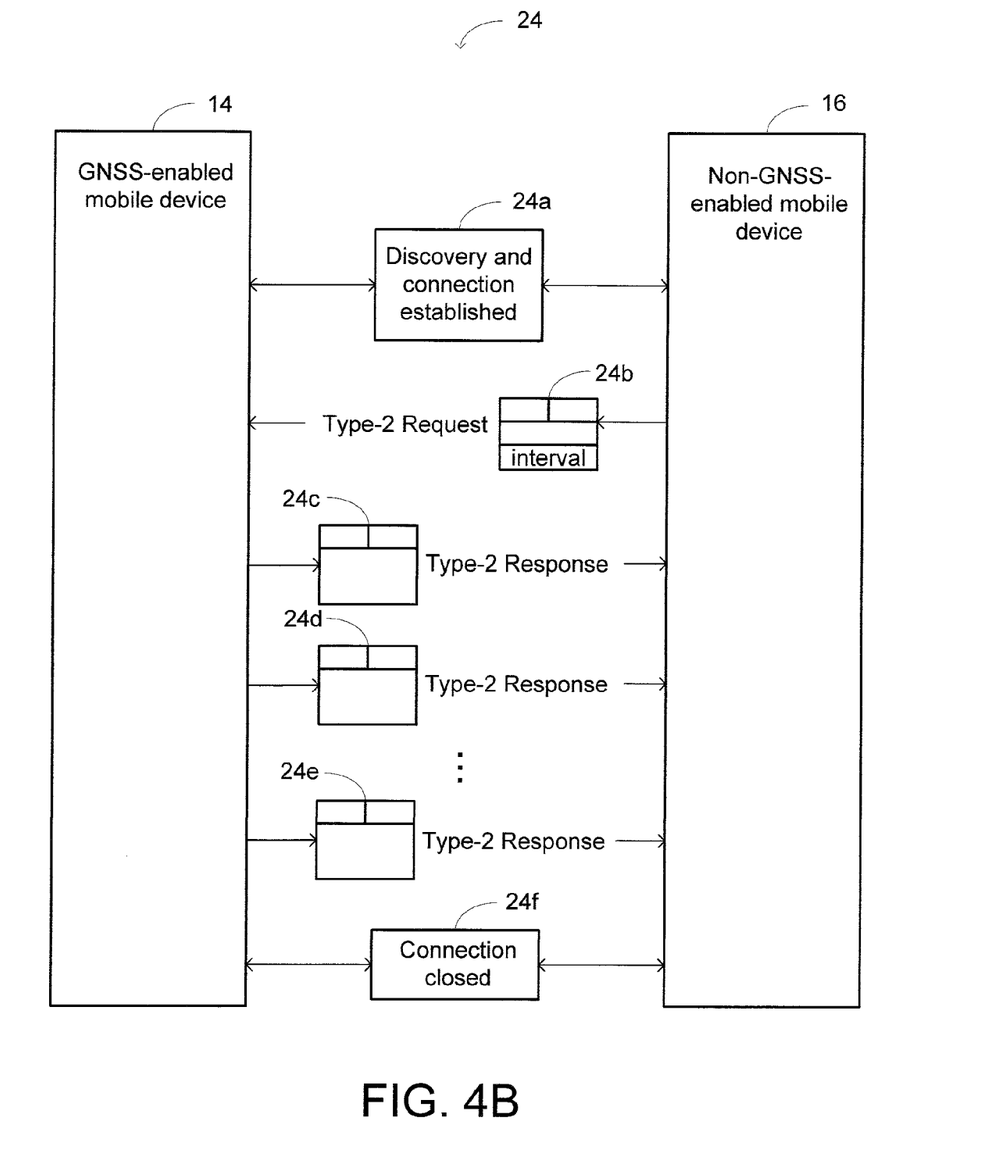
Figure 4C:
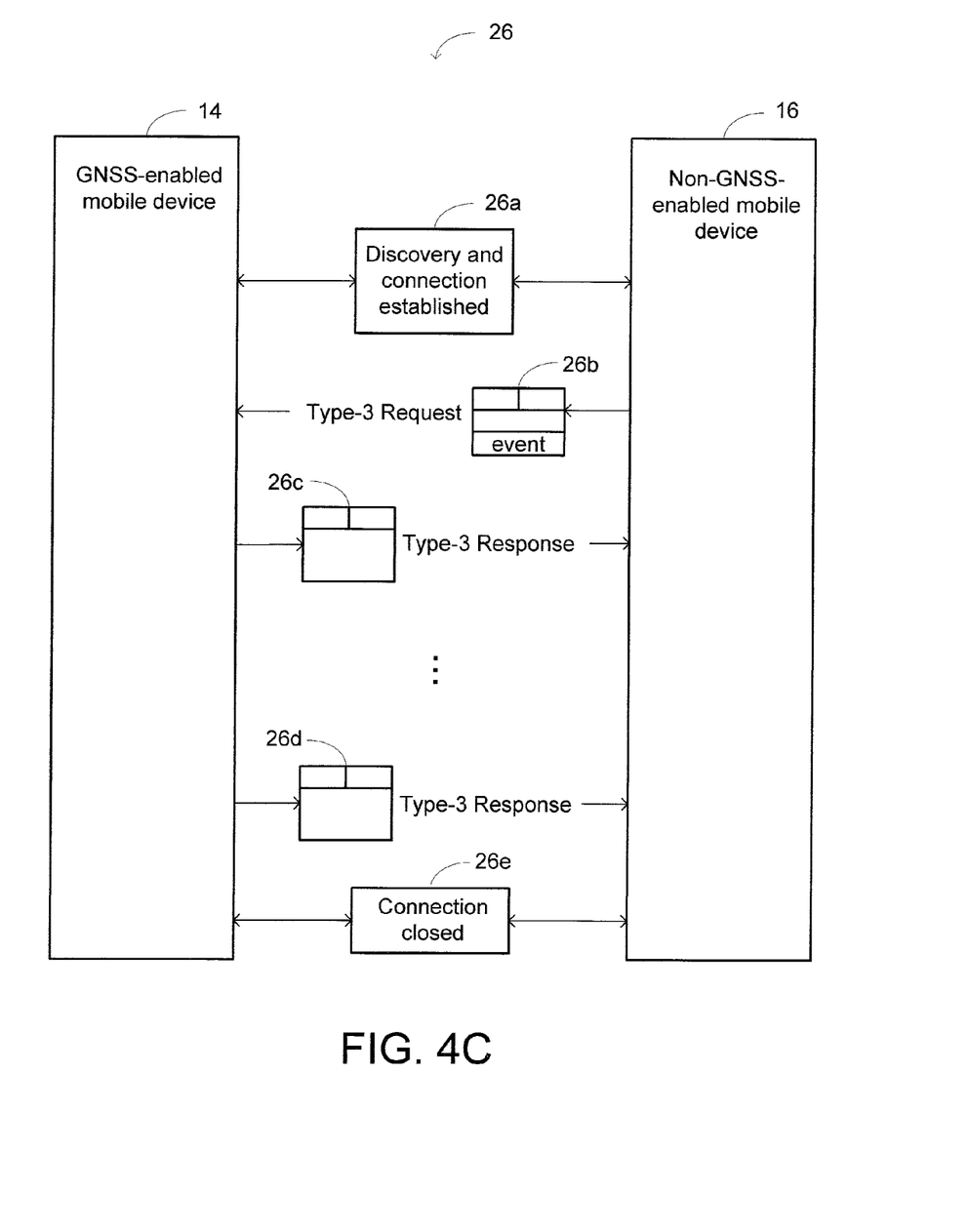

FIGS. 4A-4C are flow diagrams illustrating three alternative modes of operation of the geo-proximate devices system.

Figure 5:
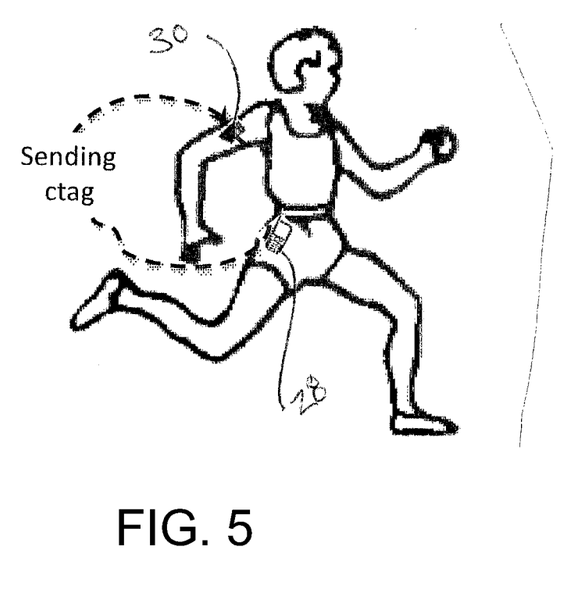
FIG. 5 is a schematic diagram illustrating a sport/vital signs monitor application utilizing the geo-proximate devices system.

FIG. 5 is a diagram illustrating a sport/vital signs monitor application utilizing the geo-proximate devices system.

Figure 6:
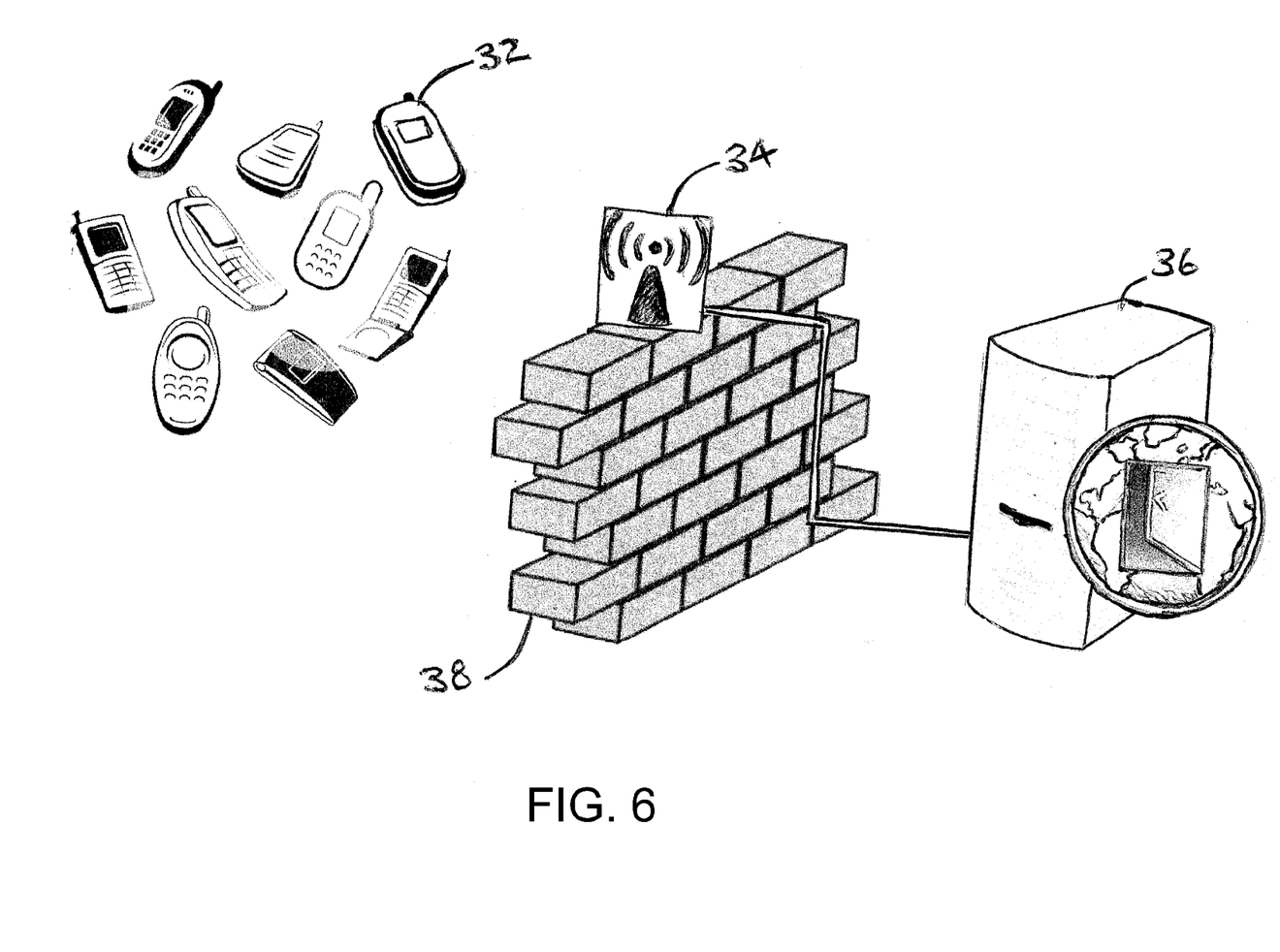
FIG. 6 is a schematic block diagram of a location discovery application utilizing the geo-proximate devices system.

FIG. 6 is a simplified schematic block diagram of a location discovery application utilizing the geo-proximate devices system.

Figure 7A:
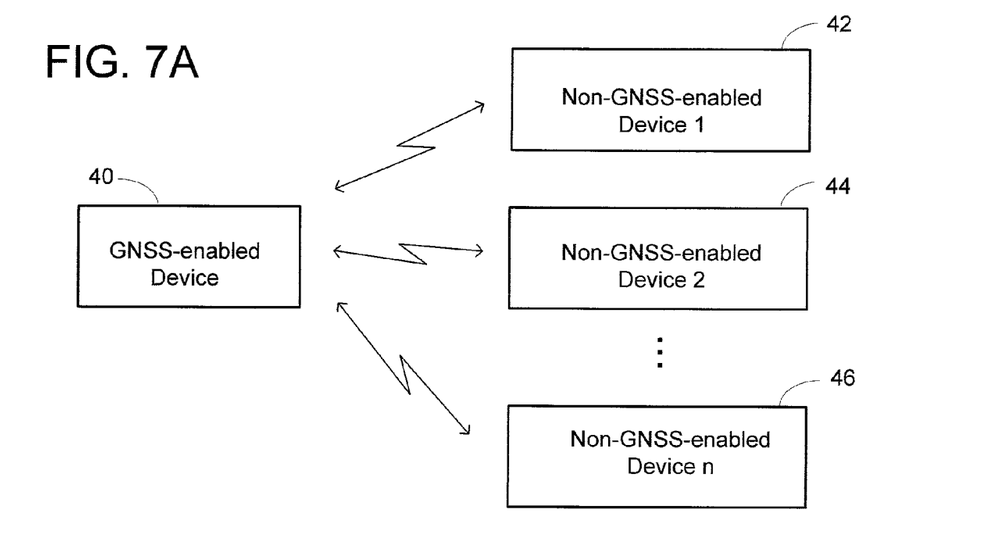
FIGS. 7A and 7B are schematic block diagrams illustrating a one-to-many and a many-to-one application utilizing the geo-proximate devices system, respectively.
Figure 7B:
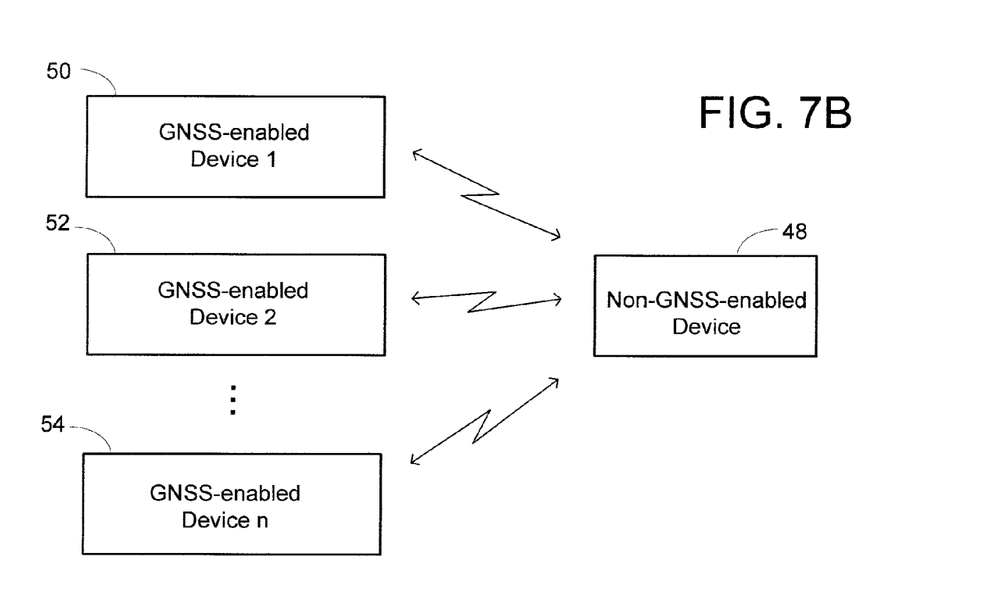

FIGS. 7A and 7B are schematic block diagrams illustrating a one-to-many and a many-to-one application utilizing the geo-proximate devices system, respectively.

DETAILED DESCRIPTION OF THE EMBODIMENTS

The disclosed and illustrated embodiments of the mobile-devices-coupling system and method operatively couple an inherently location-aware mobile device with an inherently location-unaware mobile device in such manner that the location-unaware mobile device is rendered approximate-location-aware. They do so by use of a near-field wireless conveyance that resembles a peer-to-peer (P2P) network and by use of a defined, standard protocol. Effectively, the inherently location-unaware mobile device 'buddies up' with the location-aware device so long as the location-aware and location-unaware devices are within their prescribed useful near-field range, e.g. a few meters in accordance with current WiFi and BlueTooth capabilities.

FIG. 1 is a schematic block diagram illustrating an embodiment of the geo-proximate devices system. The illustrated embodiment of geo-proximate devices-coupling system 10 includes a GNSS satellite 12 (or similar geo-location data link, utility or sensor), a location-aware (e.g. GNSS-capable) device 14, and a geo-proximate but location-unaware (e.g. GNSS-incapable) device 16. Satellite 12 is operatively connected via a radio-frequency (RF) link to mobile device 14. Device 14 in turn is wirelessly operatively connected to device 16, e.g. via a WiFi or BlueTooth or similar near-field wireless conveyance in accordance with a peer-to-peer (P2P) network protocol. One or both of devices 14 and 16 may also be capable of connecting to the Internet, but no such connection is shown in FIG. 1 because none is required to operatively couple devices 14 and 16 together to render device 16 approximate-location-aware.

Those skilled in the art will understand that devices 14 and 16 disclosed herein by way of further description and illustration may be mobile or fixed, whether relatively or absolutely. For convenience of description and illustration and without limitation, then, devices 14 and 16 may be referred to herein as "mobile devices", or, more simply and intentionally more broadly, "devices".

Mobile devices 14 and 16 each typically include a processor 14a and 16a capable of executing instructions stored in a memory 14b and 16b to act as a special-purpose computer that is the smart part of each mobile device. Mobile devices 14 and 16 each also typically include operating system (OS) layer software (or firmware, which software or firmware layer typically includes the transport/driver layer software) 14c and 16c and application layer software (or firmware) 14d and 16d. Skilled persons will appreciate that the OS layer software includes the basic capabilities of the mobile device, such as display, input, power management, data security, sound, etc., while the application-layer software includes the adjunct capabilities of the mobile device, such as phone, vital signs monitor, camera, geo-location, and/or others. Each of the mobile devices may also have a universal serial bus (USB) or like port 14e or 16e. Of course, a mobile device 14 that is a mobile phone with geo-location awareness also will typically have an antenna (not shown) that cooperates with signal-conditioning hardware (also not shown) and the phone's software.

In accordance with the disclosed embodiments, non-GNSS-enabled mobile device 16 further includes a geo-location-request mechanism 16f for polling geo-location data from GNSS-enabled mobile device 14. Conversely, GNSS-enabled mobile device 14 further includes a geo-location-response mechanism 14f for donating geo-location data to location-unaware mobile device 16 in response to such polling. These mechanisms are typically implemented in software or firmware at the application level of the respective mobile device, although those of skill in the art will appreciate such mechanisms may alternatively reside at the OS's transport/driver level.

The data packet format used in accordance with the embodiments of the invention will be described below with reference to FIGS. 2 and 3, and the request/response protocol will be described below by reference to FIGS. 4A-4C. By virtue of the operative coupling of the two geo-proximate mobile devices 14 and 16, in accordance with the embodiments, non-GNSS-capable mobile device 16 is rendered approximate-location-aware so long as the latter is within range of the former. (Those skilled in the art will appreciate that there is a trade-off between range and data rate with near-field wireless communications. Those skilled in the art also will appreciate that there is also a trade-off between range and approximate-location certainty, since the wider the near-field range, the more approximate the co-location of the geo-location data donor and recipient mobile device.)

FIG. 2 is a schematic diagram of a communication tag—(Ctag)-request data packet 18 used by the geo-proximate devices system 10 shown in FIG. 1. It will be understood that the Ctag-request data packet is sent by mobile device 16 to mobile device 14. The Ctag request data packet includes a Ctag-ID field 18a that uniquely identifies the mobile device 16 and distinguishes a request therefrom from a request from any other mobile device. The Ctag request packet also includes a Ctag-type field 18b that specifies the delivery method desired by the mobile device 16. This will be described in more detail by reference to FIGS. 4A-4C. The Ctag request packet 18 further includes a Ctag class field 18c that specifies the information object or type that is included in the next field. Finally, the Ctag request packet 18 optionally includes an information object field 18d such as a Ctag interval specifying the periodic time intervals that geo-location data should be provided or a Ctag event specifying an event upon which geo-location data should be provided.

Those skilled in the art will understand that, if the object field 18d specifying, for the example, a time interval, is not included, then periodic geo-location payload data nevertheless can be provided based upon a default time interval value that is stored in memory 14b of the GNSS-enabled mobile device 14 shown in FIG. 1. Those skilled in the art also will understand that the object field 18d, if included, alternatively may specify a different attribute, parameter, variable, or the like, consistent with the disclosed embodiments. In other words, the object field 18d is not limited to a time interval, but may be used by the non-GNSS-enabled mobile device 16 in a broad and general way to communicate any desired object to the GNSS-enabled mobile device 14.

FIG. 3 is a schematic diagram of a Ctag-payload or response data packet 20 used by the geo-proximate devices system 10 shown in FIG. 1. The Ctag response packet 20 includes a Ctag-ID field 20a that uniquely identifies the mobile device 14 and distinguishes between a response from the identified mobile device 14 and a response from any other mobile device. The Ctag response packet 20 also includes a Ctag payload length field 20b that specifies the length of the following Ctag payload field. Finally, the Ctag response packet 20 includes a Ctag payload field 20c that contains the geo-location and/or other requested data.

Those of skill in the art will understand that the various fields of the data request and data payload (response) packets may vary in order, format, length, and content from what is described and illustrated herein. For example, the fields may be of fixed length or variable length, they may be merely a few bits long or many bytes long. They may be binary, hexadecimal, alphanumeric, or alphabetic and in any desired language or pseudo-language. They may include raw data or encoded data or even encrypted data, for user and/or data security purposes. It is also possible that there can be more or fewer fields, as may be desired. In accordance with the embodiments described herein, the fields are kept short to provide a robust but simple and straightforward data packet protocol and perhaps also to realize a new geo-proximate devices-coupling industry standard for at least the disclosed geo-locating purpose.

FIGS. 4A-4C are process/method flow diagrams illustrating three alternative modes of operation of the geo-proximate devices system.

FIG. 4A illustrates a type-1 (on-demand) delivery method 22 by which geo-location data are provided by the GNSS-enabled mobile device 14 only upon demand by the non-GNSS-enabled mobile device 16. Those of skill in the art will understand that one or both of the mobile devices 14 and 16 'discovers' the other (by any suitable query/response or other polling protocol) and establishes a connection at 22a. Thereafter, mobile device 16 sends mobile device 14 one or more (e.g., two) type-1 requests at 22b and 22d to which mobile device 14 responds with a corresponding one or more (e.g. two) geo-location data packets at 22c and 22e. At some time after there are no type-1 requests from mobile device 16 to mobile device 14, the connection may be closed at 22f.

FIG. 4B illustrates a type-2 (interval-driven) delivery method 24 by which geo-location data are provided by GNSS-enabled mobile device 14 to non-GNSS-enabled mobile device 16 at specified intervals. Those of skill in the art will understand that one or both of the mobile devices 14 and 16 'discovers' the other (by any suitable query/response or other polling protocol) and establishes a connection at 24a. Thereafter, mobile device 16 sends mobile device 14 a single type-2 request (specifying an interval) at 24b to which mobile device 14 responds periodically thereafter with multiple geo-location data packets at 24c, 24d, and 24e. At some time later, the connection may be closed at 24f.

FIG. 4C illustrates a type-3 (event-driven) delivery method 26 by which geo-location data are provided by GNSS-enabled mobile device 14 to non-GNSS-enabled mobile device 16 upon the occurrence of a specified event. Those of skill in the art will understand that one or both of the mobile devices 14 and 16 'discovers' the other (by any suitable pinging, query/response or other polling technique) and establishes a connection at 26a. Thereafter, mobile device 16 sends mobile device 14 a single type-3 request (event-driven) at 26b to which mobile device 14 responds zero or more (e.g. two) times thereafter with zero or more (e.g. two) corresponding geo-location data packets at 26c and 26d, dependent upon whether and how many times the specified event occurs. At some time later, the connection may be closed at 24e. Those of skill in the art will understand that such a type-3 (event-driven) request/response might specify as an event, for example, a change of geo-location of more than a given amount, e.g. 1 meter, thereby to effect more certainty, or at least less uncertainty, in the approximate-geo-location of the non-GNSS-enabled mobile device.

Those skilled in the art will understand that the disclosed request mechanism 16f and corresponding response mechanism 14f may be straightforwardly programmed to communicate with one another via the disclosed Ctag-request data packet 18 and Ctag-response data packet 20 in accordance with the disclosed communication protocol using standard programming languages and software development tools. Such is a straightforward software coding task within the skill of the ordinary programmer and involves defining the data packets via data structures and implementing the protocol via subroutines or other suitable calls or signals. Thus, for the sake of brevity and clarity, the details of such straightforward software coding are not explicated in detail herein.

Those of skill in the art also will appreciate that the request and response mechanisms 14f and 16f in the form of miniature software applications or so-called 'apps' may be cross-loaded to the respective GNSS-enabled and non-GNSS-enabled mobile devices 14 and 16 via any suitable conveyance. For example, the mini-apps may be down-loaded or cross-loaded from a laptop computer or the Internet and automatically installed and operated. They may be cross-loaded via a USB port or a WiFi or BlueTooth conveyance. For example, the request mechanism 16f of the non-GNSS-enabled mobile device 16 may be cross-loaded by the GNSS-enabled mobile device 14 in the form of an execute file (.exe) (e.g. a file containing an executable sequence of instructions and a command to device 16 to execute the same) or the like to cause the non-GNSS-enabled mobile device 16 to install and execute and operate the mini-app in the disclosed manner. Any and all such ways of installing the mini-apps on a mobile device after manufacture thereof are contemplated. (Of course, newly manufactured GNSS-enabled mobile devices such as a mobile phone may have the response mechanism and/or the start-up execute file pre-programmed into their memories so that no field retrofitting is needed, whereas older non-GNSS-enabled mobile devices such as a camera may require the request mechanism implemented in software to be field retrofitted via a simple firmware update.)

FIG. 5 is a schematic diagram illustrating a an exemplary sport/vital signs monitor application utilizing the geo-proximate devices system of which embodiments are described herein. A runner is shown with a GNSS-enabled mobile device such as a mobile phone 28 on his running shorts and with a sports or vital signs, e.g. blood pressure or cardiac waveform or pulse oximetry or other, monitor 30 on his upper arm. GNSS-enabled mobile phone 28 and non-GNSS-enabled vital signs monitor 30 are geo-proximate and are near-field, wirelessly coupled to one another in accordance with the embodiments described herein. They may utilize any desired Ctag request/response type to donate geo-location data from mobile phone 28 to monitor 30, thereby enabling monitor 30 to know its approximate geo-location. In the case of a recordable vital signs event such as an arrhythmia, then, vital signs monitor 30 may record not only the time and date and data describing the arrhythmia, e.g. an entire digitized cardiac waveform or PQRST segment thereof, but may also record potentially helpful information about the runner's geographic location at the time of the arrhythmia, including absolute or relative elevation information. This added geographical context data might assist a doctor or clinical analyst to better diagnose and treat the runner's cardiac or health condition.

FIG. 6 is a simplified schematic block diagram of a location-discovery application utilizing the geo-proximate devices system of which embodiments are described herein. The ubiquity of the GNSS-enabled mobile phone such as mobile phone 32 enables geo-proximate but location-unaware mobile devices such as a connected WiFi access point (AP) 34 and an in-turn connected server 36 collectively connected to become location-aware. The former barrier 38 between the AP and its connected server as to location awareness is removed in accordance with the geo-proximate devices-coupling system and method embodiments described herein.

FIGS. 7A and 7B are schematic block diagrams illustrating a one-to-many and a many-to-one application utilizing the geo-proximate devices system, respectively. Briefly, it will be understood that FIG. 7A simply illustrates a one-to-many use of the embodiments described herein wherein a single GNSS-enabled or otherwise location-aware device 40 is coupled with n non-GNSS-capable or otherwise location-unaware mobile devices 42, 44, . . . 46 (where n is a positive integer). Also briefly, and conversely, it will be understood that FIG. 7B simply illustrates a many-to-one use of the embodiments described herein wherein a single non-GNSS-enabled or otherwise location-unaware device 48 is coupled with n GNSS-enabled or otherwise location-aware devices 50, 52, . . . 54.

The reason for inclusion in the request/response data packets of Ctag-ID fields 18a and 20a is now evident, since their inclusion enables applications wherein there are multiple devices whether location-aware (e.g. GNSS-enabled) or location-unaware (e.g. non-GNSS-enabled). Thus, for example, two or more GNSS-enabled mobile devices (e.g. mobile phones) can be geo-proximately coupled with a single non-GNSS-enabled mobile device (e.g. a broadband router), and/or a single GNSS-enabled mobile device (e.g. a mobile phone) can be geo-proximately coupled with two or more non-GNSS-enabled mobile devices (e.g. a broadband router and a television (TV)), as will be understood.

Mobile devices that are non-GNSS-enabled may be retrofitted with software and/or firmware enabling them to be operatively coupled with GNSS-enabled geo-proximate mobile devices. Such retrofit can be via a USB port in the non-GNSS-enabled device or a simple firmware code update via a wireless connection to an Internet-connected laptop computer or a simple swap of a memory device provided in the mobile device. Mobile devices that are GNSS-enabled can also be retrofitted with the software and firmware described herein so that they are capable of establishing, utilizing, and ending a geo-location connection with a non-GNSS-enabled device in the manner described and illustrated herein. New GNSS-enabled devices of course can be manufactured with the geo-location software/firmware already installed and ready to use. The possibility of providing location-awareness to a world of location-unaware mobile devices thus brings benefits far in excess of the cost of any required retrofits.

It may be seen that a multitude of location-aware applications for this new technology are possible, in addition to those exemplary applications illustrated herein and described above.

For example, a laptop computer assigned by a company to an individual employee may be without location awareness. Such a laptop computer might be subject, however, to an employment agreement forbidding the employee from taking the company's laptop computer home. The company could enforce such an agreement by coupling the assigned laptop computer with the employee's mobile phone, which is enabled with location awareness. As a result, the laptop computer becomes location-aware and the company can monitor its proximity to the assigned employee's mobile phone. If the employee inadvertently (or intentionally) takes the laptop computer home, the company could detect such a problem from the fact that the laptop computer is with the employee after the employee's scheduled or regular work hours, and thus most likely is outside the employer's facility's perimeter.

A content provider like NETFLIX could better secure the authorized use of its content by only licensed users by incorporating the technology in its mobile player/router boxes. So long as the licensed player/router box is geo-proximately coupled with the licensed user's mobile phone or other location-aware device, the content provider knows that the content is being used by an authorized user. If, on the other hand, the mobile player/router box is moved to a different location, then the content provider might reasonably assume there is ongoing an unauthorized use of content. Similarly, the content provider could detect that multiple users who are geo-remote from one another nevertheless appear to be sharing the same license in violation of its end-user license agreement.

So-called Access Point Media Access Control (AP MAC) packet/wireless "sniffer" technology providers like SKYHOOK, NAVIZON, NX Networks, or UBLOX might use the technology to enable or facilitate AP MAC address-sniffing, crowd-sourcing, cloud-positioning, etc. In such an application of the disclosed embodiments wherein a crowd of people are found, one such person having a GNSS-enabled mobile phone who is within range of a non-GNSS-enabled WiFi AP can source the approximate geo-locations other members of the crowd to a sniffer technology provider. Thus, the approximate locations of all WiFi APs and mobile devices within a vicinity of the single GNSS-enabled mobile device become known to the sniffer technology provider. Such knowledge enables databases to be developed and filters to be utilized whereby crowd members congregating near a WiFi AP could, for example, be solicited and/or targeted for on-line purchases of goods or services or other commercial or public service purposes.

A vital signs monitor that has no geo-location capability could be coupled with a location-aware device such as a mobile phone owned by the person undergoing vital signs monitoring. As a result, the vital signs monitor becomes location-aware, and can not only time-and-date-stamp a noteworthy event, e.g. a cardiac abnormality, but also can tag the event in the record with the geographic coordinates corresponding with where the event occurred. In other words, the longitude, latitude, and elevation of the cardiac event can be recorded in the vital signs monitor event record. Such might assist a physician or skilled clinician in determining whether geography played a part in the monitored-subject's recorded cardiac or alternative vital-signs event.

Similarly, a pedometer that has no location awareness nevertheless could be coupled using the technology with a location-aware device such as a runner's or walker's mobile phone. By recording geographic data, the pedometer could be used to track the user's exercise with excellent geo-precision (since the mobile phone and the pedometer are presumably both on the runner's or walker's person and thus very geo-proximate). Or it could authenticate that the runner's or walker's exercise routine was genuine and that any recorded data regarding the same is authentic.

Similarly, a still or video camera having no location-awareness could be coupled to a location-aware device such as the camera owner's mobile phone. Such would provide the camera with not only date and time stamps on each still or video segment, but also geographic data regarding when the still or video segment was recorded. Such might greatly enhance the value of the camera's recording as an video archive or album.

A location-unaware device such as a camera, a sports or vital signs monitor, a pedometer, a notebook computer, a Wi-Fi stack or AP, a broadband TV (BT), a TV, a digital video recorder (DVR), a XBOX game console, a server, a router, or the like could by use of the technology become approximate-location-aware. Those of skill in the art will understand that this list is illustrative but not exhaustive of the universe of applications in which the disclosed geo-proximate devices-coupling system and method is useful.

This might, for example, enable a TV that has been moved to a new apartment to determine its list of acceptably receivable channels without use of the time-consuming auto-program button on the remote control (RC). Such would be possible by coupling the TV with a location-aware device such as the owner's mobile phone, thereby enabling the TV automatically to 'know' its geo-location and thus its stronger channel prospects with less effort by the TV's owner.

Low-cost updates of software or firmware to existing equipment that is non-GNSS-enabled can take place in the field at relatively low cost, thus enabling myriad location-aware applications for previously location-unaware devices.

The disclosed embodiments enable mobile device security against unauthorized use, theft, or loss, as a non-GNSS-enabled mobile device can 'know' where it is currently located relative to a coupled GNSS-enabled mobile device. A location-aware application, for example, could report to a user or to a user application that the location-unaware device has been separated or removed from its coupled location-aware device, and where and when the removal occurred, as such formerly proximate-devices separation or removal might have been unauthorized and might represent a misplacement, loss, or theft of one or the other of the formerly coupled devices.

As noted above, two devices that are coupled in accordance with the disclosed embodiments may or may not share common ownership. They may belong to the same or different persons. Moreover, the near-field coupling can be known to all, some, or none of the device users. The applications for the geo-proximate devices-coupling system and method embodiments of which are disclosed herein may enhance the security of a device or its data contents, or they may simply enhance an application's value by providing desirable geo-location data. Thus, the 'buddying' applications that are made possible by the disclosed embodiments are varied and broad, in that the disclosed embodiments enable intelligent applications that may require, or may be enhanced by, a non-location-unaware device knowing its approximate geo-location.

Those of skill in the art will appreciate that the software architecture and methodologies described and illustrated herein can be implemented in any suitable code by the use of any suitable coding and language tools. For example, any one or more of Python, Java, C#, C++, HTML, XML, and MySQL form a suitable suite of tools for coding the system and method disclosed and illustrated herein.

Finally, those of skill in the art will appreciate that the system and method described and illustrated herein in their various embodiments may be implemented in software, firmware or hardware, or any suitable combination thereof. The system and method in accordance with one embodiment may be implemented in any combination of two or more of the three, for purposes of low cost and flexibility. Thus, those of skill in the art will appreciate that embodiments of the system and method disclosed herein may be implemented by a computer or microprocessor process in which instructions are executed, the instructions being stored for execution on a computer-readable medium such as a memory device and being executed by any suitable instruction processor operatively coupled thereto.

While example embodiments of the inventive concepts have been particularly shown and described, it will be understood by one of ordinary skill in the art that variations in form and detail may be made therein without departing from the spirit and scope of the attached claims.

What is claimed is:

1. A geo-locating system, comprising:
a first device configured with position determination capability, the first device further configured to establish an operative communication with a second device by way of a wireless connection thereby to form an operatively coupled pair of devices, the first device further configured thereafter to continue operative wireless communication with the second device thereby to transmit current position data to the second device, the current position data representing an approximate position of the operatively coupled pair of first and second devices; and
the second device, the second device not being configured with position determination capability, the second device being further configured to establish operative communication with the first device and thereafter to store current position data received therefrom so long as the first and second devices are within range of their established wireless connection, and the second device being further configured to communicate to the first device a request to communicate the current position data to the second device, the request comprising a field containing information relating to one of a plurality of possible occurrences that in response to one of the possible occurrences causes the first device to communicate the current position data to the second device, the information relating to the one of the plurality of possible occurrences comprising a predetermined event,
wherein the first and second devices further are configured to effect such operative communication including delivery of current position data in response to the occurrence of the predetermined event in accordance with a defined signaling protocol.

2. The system of claim 1, wherein the second device in order to establish the operative connection sends to the first device the request for geo-location data from the first device to be conveyed to the second device in accordance with the defined protocol.

3. The system of claim 1, wherein the first device in order to establish the operative connection sends to the second device an executable sequence of instructions and a command to the second device to execute the instructions, and wherein the second device in response sends to the first device a request for geo-location data from the first device to be conveyed to the second device in accordance with the defined protocol.

4. The system of claim 1, wherein the first device updates the position data and sends updated position data to the second device upon a demand by the second device.

5. The system of claim 1, wherein the first device updates the position data and sends updated position data to the second device periodically and automatically regardless of whether the geo-location data have changed.

6. The system of claim 1, wherein the data are updated via one or more predefined data packets in accordance with the predefined signaling protocol.

7. The system of claim 6, wherein the operative communication is effected via a near-field wireless conveyance mechanism.

8. The system of claim 7, wherein the signaling protocol incorporates a peer-to-peer (P2P) wireless standard.

9. A method for enabling a location-unaware device having no self-geo-locating capability to determine its geo-location, the method comprising:
   operatively wirelessly coupling the location-unaware device with a physically proximate and geo-location-aware device,
   conveying from the location-unaware device to the geo-location-aware device a request to convey geo-location data from the geo-location-aware device to the location-unaware device, the request comprising a field containing information relating to one of a plurality of possible occurrences that in response to one of the occurrences causes the geo-location-aware device to convey geo-location data to the location-unaware device, the information relating to the one of the plurality of possible occurrences comprising a predetermined event, and
   conveying geo-location data from the location-aware device to the geo-location-aware device in response to the occurrence of the predetermined event, thereby to render the location-unaware device approximate-location-aware,
   wherein the conveying of geo-location data from the location-aware device to the location-unaware device is performed in accordance with a defined signaling protocol.

10. The method of claim 9, wherein the coupling and the conveying are performed by executing memory-stored instructions by one or more processors.

11. The method of claim 10, wherein the operative communication is effected via a near-field wireless conveyance mechanism.

12. The method of claim 11, wherein the conveying of the geo-location data is performed in accordance with the predefined signaling protocol.

13. The method of claim 12, wherein the predefined signaling protocol incorporates a peer-to-peer (P2P) wireless standard.

14. A system for operatively coupling a pair of physically proximate devices, the system comprising:
   a) at least one location-aware device each having a first defined device identifier, and
   b) at least one location-unaware device each having a second defined device identifier,
   wherein the at least one location-aware device is configured to donate geo-location information to the at least one location-unaware device over a near-field wireless conveyance, and wherein the at least one location-unaware device is configured to receive geo-location information from the at least one location-aware device over the near-field wireless conveyance, and
   wherein the at least one location-unaware device is further configured to communicate a request to the at least one location-aware device, the request comprising a field containing information relating to one of a plurality of possible occurrences that upon the occurrence of one of the plurality of possible occurrences causes the at least one location-aware device to donate the geo-location information to the at least one location-unaware device, the information relating to the one of the plurality of possible occurrences comprising a predetermined event, and wherein the at least one location-aware device is further configured to donate the geo-location information to the at least one location-unaware device upon the occurrence of the predetermined event.

15. The system of claim 14, wherein the donated and received geo-location information is conveyed in accordance with a predefined signaling protocol.

16. The system of claim 15, wherein the predefined signaling protocol incorporates a peer-to-peer (P2P) wireless standard.

17. The system of claim 14, wherein the geo-location information is requested by the location-unaware device and is conveyed in a data packet along with location-unaware device identification (ID) information.

18. The system of claim 17, wherein the geo-location information is donated by the location-aware device in response to a request from the location-unaware device and is conveyed in a data packet along with location-aware device identification (ID) information, the data packet having a predefined form and content.

* * * * *